United States Patent
Bulumulla et al.

(10) Patent No.: US 9,785,782 B2
(45) Date of Patent: *Oct. 10, 2017

(54) MONITORING SYSTEM AND SHARED ACCESS PERMISSIONS FOR A PLURALITY OF USERS

(71) Applicant: salesforce.com, inc., San Francisco, CA (US)

(72) Inventors: Irandi Bulumulla, San Francisco, CA (US); Bulent Cinarkaya, San Jose, CA (US); Yurika Sebata-Dempster, San Francisco, CA (US); Tripti Sheth, Fremont, CA (US); Alex Warshavsky, Walnut Creek, CA (US); Brian Zotter, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,098

(22) Filed: Dec. 29, 2014

(65) Prior Publication Data

US 2015/0286828 A1  Oct. 8, 2015

Related U.S. Application Data

(63) Continuation of application No. 12/968,203, filed on Dec. 14, 2010, now Pat. No. 8,925,041.

(60) Provisional application No. 61/320,200, filed on Apr. 1, 2010.

(51) Int. Cl.
| | | |
|---|---|---|
| *G06F 7/04* | (2006.01) | |
| *G06F 17/30* | (2006.01) | |
| *H04N 7/16* | (2011.01) | |
| *G06F 21/60* | (2013.01) | |
| *G06F 21/62* | (2013.01) | |
| *G06F 21/00* | (2013.01) | |

(52) U.S. Cl.
CPC ............ *G06F 21/604* (2013.01); *G06F 21/00* (2013.01); *G06F 21/6218* (2013.01); *G06F 2221/2141* (2013.01)

(58) Field of Classification Search
CPC .. G06F 21/6218; G06F 21/10; G06F 21/6245; G06F 21/31; H04L 63/10
USPC .......................................................... 726/28
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

U.S. Appl. No. 60/828,192, filed Oct. 4, 2006.

(Continued)

*Primary Examiner* — Kambiz Zand
*Assistant Examiner* — Stephen Sanders
(74) *Attorney, Agent, or Firm* — Haynes Beffel & Wolfeld LLP; Ernest J. Beffel, Jr.

(57) ABSTRACT

In accordance with embodiments, there are provided mechanisms and methods for performing one or more actions based on determined access permissions for a plurality of users. These mechanisms and methods for performing one or more actions based on determined access permissions for a plurality of users can enable improved data collection and analysis, enhanced client knowledge of system access, etc.

25 Claims, 27 Drawing Sheets

(56) References Cited

U.S. PATENT DOCUMENTS

| | | | |
|---|---|---|---|
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,202,066 B1 * | 3/2001 | Barkley | G06F 21/6218 707/785 |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,519,571 B1 | 2/2003 | Guheen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,758 B1 | 2/2007 | Chan | |
| 7,209,929 B2 | 4/2007 | Dominguez, Jr. et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0038988 A1 | 2/2005 | Himmel et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0223022 A1 | 10/2005 | Weissman et al. | |
| 2005/0283478 A1 | 12/2005 | Choi et al. | |
| 2006/0021019 A1 | 1/2006 | Hinton et al. | |
| 2006/0206834 A1 | 9/2006 | Fisher et al. | |
| 2007/0050467 A1 | 3/2007 | Borrett et al. | |
| 2008/0120725 A1 * | 5/2008 | Asher | G06Q 10/087 726/27 |
| 2008/0249972 A1 | 10/2008 | Dillon | |
| 2009/0063415 A1 | 3/2009 | Chatfield et al. | |

OTHER PUBLICATIONS

U.S. Appl. No. 12/968,203—Office Action dated Jul. 12, 2013, 21 pages.

U.S. Appl. No. 12/968,203—Office Action dated Jul. 19, 2012, 16 pages.

U.S. Appl. No. 12/968,203—Final Office Action dated Feb. 13, 2014, 17 pages.

(56) References Cited

OTHER PUBLICATIONS

U.S. Appl. No. 12/968,203—Final Office Action dated Jan. 9, 2013, 16 pages.

\* cited by examiner

Administration Setup
- ⊞ Manage Users
- ⊞ Company Profile
- ⊟ Security Controls
  - Sharing Settings
  - Field Accessibility
  - Password Policies
  - Session Settings
  - Network Access
  - View Setup Audit Trail
  - Account Owner Report
  - Expire All Passwords
  - Compliance BCC Email
  - Delegated Administration
  - Remote Site Settings
  - HTML Documents and Attachments Settings
  - Test Email Deliverability
  - Portal Health Check New!
- ⊞ Communication Templates

MONITORING SYSTEM AND SHARED ACCESS PERMISSIONS FOR A PLURALITY OF USERS

CLAIM OF PRIORITY

This application is a continuation of U.S. application Ser. No. 12/968,203, entitled "SYSTEM, METHOD AND COMPUTER PROGRAM PRODUCT FOR PERFORMING ONE OR MORE ACTIONS BASED ON A DETERMINED ACCESS PERMISSIONS FOR A PLURALITY OF USERS", issued Dec. 30, 2014 as U.S. Pat. No. 8,925,041, which claims the benefit of U.S. Provisional Patent Application 61/320,200, entitled "PORTAL SECURITY HEALTH CHECK," filed Apr. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to analyzing system data, and more particularly to performing one or more actions based on the analysis of system data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional systems, it may be desirable to analyze and optimize one or more elements present in a system. For example, an entity may desire an optimized portal configuration within their system. Unfortunately, conventional analysis and optimization systems have been associated with various limitations.

Just by way of example, traditional methods of analyzing and optimizing one or more elements present in a system may involve collecting a large volume of different types of data within a system. The volume and diversity of this system data, in addition to the necessity for retrieval of data for multiple users, may make data collection and analysis prohibitive for an entity. Further, the entity may be unfamiliar with the system and/or optimizations recommended for the system. Accordingly, it is desirable to provide techniques that simplify data collection and analysis.

BRIEF SUMMARY

In accordance with embodiments, there are provided mechanisms and methods for performing one or more actions based on determined access permissions for a plurality of users. These mechanisms and methods for performing one or more actions based on determined access permissions for a plurality of users can enable improved data collection and analysis, enhanced client knowledge of system access, etc.

In an embodiment and by way of example, a method for performing one or more actions based on determined access permissions for a plurality of users is provided. In one embodiment, a plurality of users with restricted access to a multi-tenant system is identified. Additionally, access permissions of the plurality of users to the system are determined. Further, one or more actions are performed, based on the determined access permissions.

While one or more implementations and techniques are described with reference to an embodiment in which performing one or more actions based on determined access permissions for a plurality of users is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 3 illustrates an exemplary interface for accessing a portal health check tool in an administration setup, in accordance with yet another embodiment;

FIG. 8 illustrates an exemplary administrator and user permissions report summary, in accordance with one embodiment;

FIG. 21 illustrates an exemplary email template folders report page, in accordance with another embodiment;

DETAILED DESCRIPTION

General Overview

Systems and methods are provided for performing one or more actions based on determined access permissions for a plurality of users.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for performing one or more actions based on determined access permissions for a plurality of users will be described with reference to example embodiments.

Figure 1:
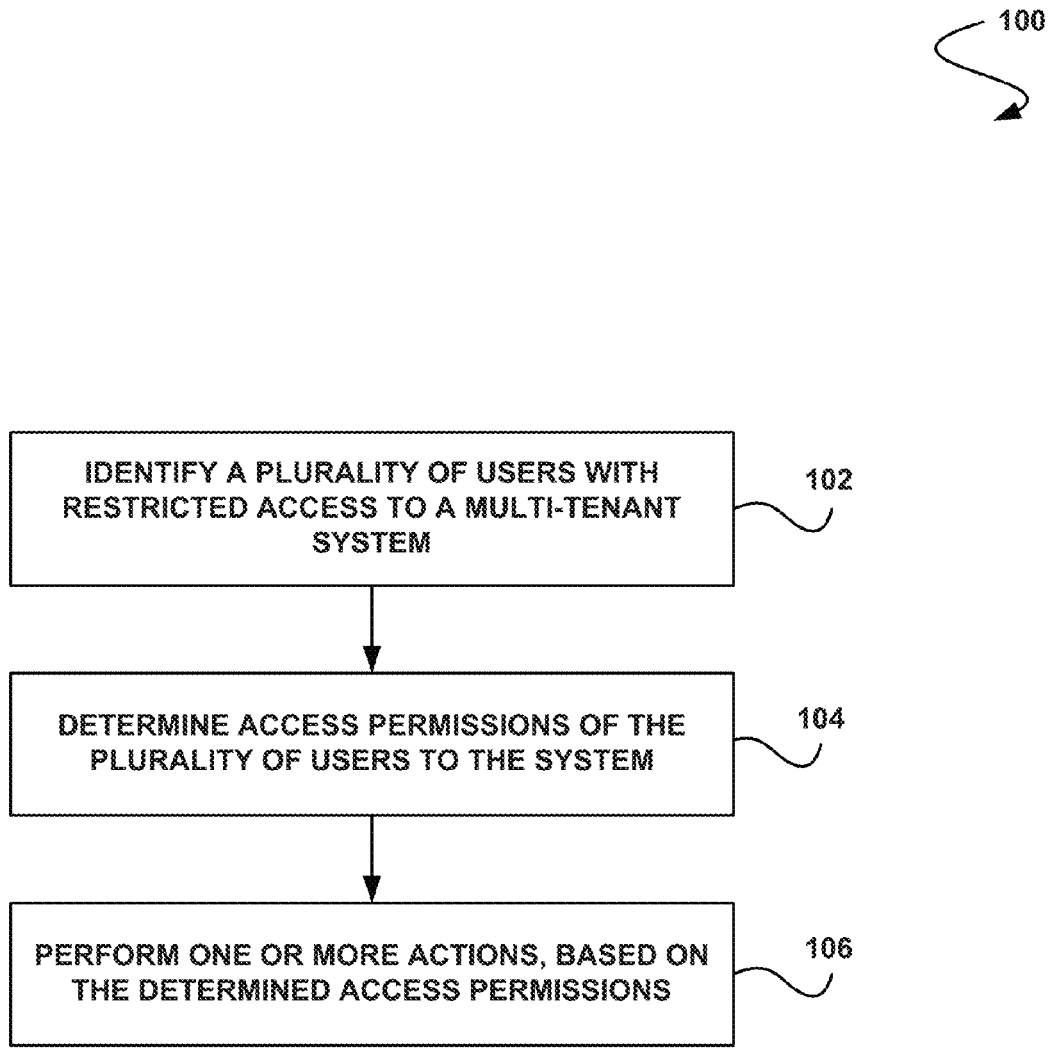
FIG. 1 illustrates a method for performing one or more actions based on determined access permissions for a plurality of users, in accordance with one embodiment.

FIG. 1 illustrates a method 100 for performing one or more actions based on determined access permissions for a plurality of users, in accordance with one embodiment. As shown in operation 102, a plurality of users with restricted access to a multi-tenant system is identified. In one embodiment, the plurality of users may include any users of the multi-tenant system without full access to the multi-tenant system. For example, the plurality of users may include users outside of the multi-tenant system that do not have fully functional access to the system, have restricted access to the system, etc. In another embodiment, the plurality of users may include a plurality of portal users. For example, a customer of the multi-tenant system may in turn have a plurality of portal customers that have limited access to the multi-tenant system (e.g., through a portal such as a web interface, etc.). In yet another embodiment, the plurality of users may be associated with one or more groups within the system (e.g., may be customers of one or more organizations within the system, etc.).

Additionally, in one embodiment, the multi-tenant system may include any system that includes a plurality of tenants (e.g., customers, users, etc.). For example, the multi-tenant system may include a multi-tenant computer system. In another example, the multi-tenant system may include a multi-tenant database system, (e.g., a multi-tenant on-demand database system, etc.).

It should be noted that, as described above, the multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further, as shown in operation 104, access permissions of the plurality of users to the system are determined. In one embodiment, determining the access permissions of the plurality of users may include determining one or more data elements in the system that are accessible by the plurality of users. In another embodiment, determining the access permissions of the plurality of users may include determining one or more system permissions granted to the plurality of users. Of course, however, determining the access permissions of the plurality of users to the system may include determining any elements associated with access to the system by the plurality of users.

In another embodiment, the access permissions of the plurality of users to the system may be determined by monitoring one or more elements of access to the system. For example, determining the access permissions may include monitoring administrator and user permissions for the system. In another example, determining the access permissions may include monitoring object permissions and field level security (FLS) for the system. In yet another example, determining the access permissions may include monitoring sharing organization wide defaults for the system, sharing rules for the system, manual and apex managed sharing, etc.

Additionally, in one example, determining the access permissions may include monitoring territories of the system. In another example, determining the access permissions may include monitoring document folders, report folders, dashboard folders, email template folders, etc. Further, in yet another example, determining the access permissions may include monitoring list views of the system. In still another example, determining the access permissions may include monitoring queues of the system, public groups of the system, a content workspace of the system, etc.

In another embodiment, the monitoring of one or more elements of access to the system may be performed on a constant basis. In yet another embodiment, the monitoring of one or more elements of access to the system may be performed in an on-demand fashion (e.g., as a snapshot of the current access, etc.). Additionally, in one embodiment, the monitoring of one or more elements of access to the system may be performed according to a schedule. Of course, however, the monitoring may be performed in any manner.

In another embodiment, monitoring the one or more elements of access to the system may include querying the system for information. For example, one or more queries to the system may be performed for each organization associated with the system in order to retrieve information associated with the access permissions of the plurality of users.

Further, in one embodiment, determining the access permissions may include tracking access via a portal by the plurality of users. For example, one or more elements of portal access data may be retrieved. In another embodiment, determining the access permissions may include tracking a potential for usage of one or more system elements by the plurality of users via the portal. For example it may be determined how many portal users have access to a particular element of the system via the portal.

Further still, as shown in operation 106, one or more actions are performed, based on the determined access permissions. In one embodiment, performing the one or more actions may include notifying a client (e.g., a customer, administrator, etc.) of the multi-tenant system about the access permissions of the plurality of users. In another embodiment, performing the one or more actions may include displaying a report to a client of the system. For example, the access permissions of the plurality of the users may be aggregated, and a report may be provided to the client that summarizes the access permissions of the plurality of the users, utilizing the aggregation.

In another embodiment, specific system data may be highlighted to the client. For example, one or more data elements within the system (e.g., objects, files, applications, etc.) may be listed as being accessible by one or more of the plurality of users. In another example, specific permissions given to one or more of the plurality of users may be provided to the client. In this way, the client may be made aware of data access and access permissions within the system and may be able to determine whether such access is desirable or undesirable.

Additionally, in one embodiment, numeric statistical data may be provided to the client. For example, a number of objects (e.g., account objects, etc.) accessible by one or more of the plurality of users may be provided to the client. In another embodiment, the determined access permissions may be provided via a summary page. For example, a summary page may list the aggregated access permissions of the plurality of users, where such access may be listed hierarchically by category (e.g., permissions, objects accessed, users with access, etc.).

Further, in another embodiment, one or more links may be provided to the client. For example, one or more hyperlinks may be provided within the report that link to one or more setup pages associated with the reported access, such that the client may select the hyperlink and change one or more settings associated with the reported access. In another example, the one or more links may retrieve additional information associated with the determined access permissions (e.g., a details summary of retrieved portal information, etc.). In this way, a general overview of the determined access permissions may be provided to the client, where the client may access a more details view of such determined access permissions, and may further alter system elements based on the determined access.

Further still, in one embodiment, one or more actions may be taken in response to the determined access permissions being run against preconfigured logic. For example, the determined access permissions may be compared against a predetermined amount of access, and one or more operations may be performed based on the comparison (e.g., an alert may be triggered if an amount of access exceeds a predetermined amount, etc.). In another example, it may be determined whether particular access is allowed by comparing the determined access permissions against one or more criteria, and if such particular access is allowed, one or more settings, data, etc. may be automatically modified in the system.

In another embodiment, access to the report may be restricted. For example, one or more permissions may be required to view the report. In yet another embodiment, the report may be provided according to a schedule. Also, in one embodiment, results of the report may be saved. For example, a history of reports may be compiled, and such saved reports may be compared against each other as well as new reports, may be analyzed for one or more trends, etc.

In this way, a client may be made aware of a state of user access to the system, and may determine whether such state of user access is appropriate. Additionally, in a system having numerous places to change settings associated with users with restricted access, a client may review a report summarizing the current access of the plurality of users to the system and may have a broad view of what such user can access without having to view individual system access aspects one at a time.

Figure 2:
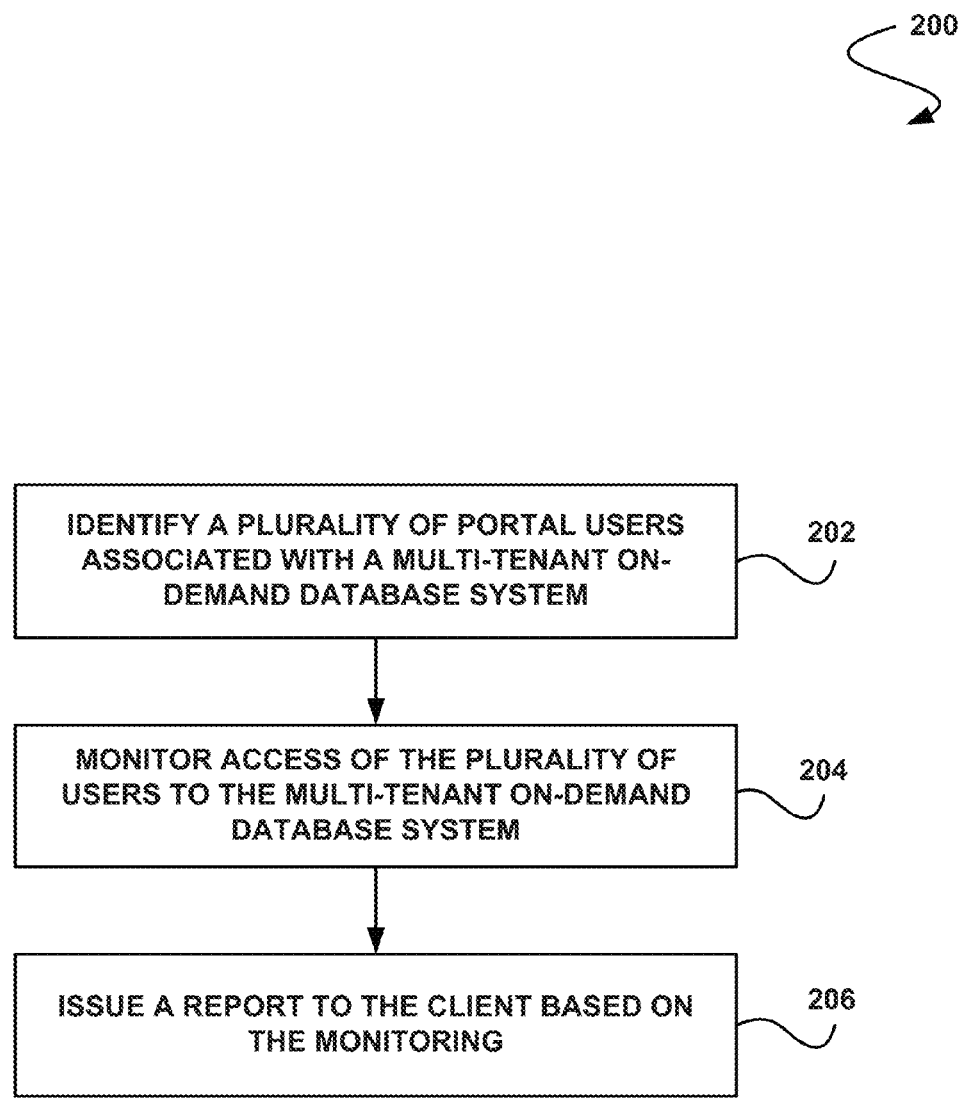
FIG. 2 illustrates a method for performing a portal security health check of a multi-tenant on-demand database system, in accordance with another embodiment.

FIG. 2 illustrates a method 200 for performing a portal security health check of a multi-tenant on-demand database system, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a plurality of portal users associated with a client of a multi-tenant on-demand database system is identified. In one embodiment, the client may include a customer, user, administrator, etc. of the multi-tenant on-demand database system. In another embodiment, the plurality of portal users may include customers of the client, partners or other associates of the client, or any users associated with the client that are not themselves clients of the multi-tenant on-demand database system. In yet another embodiment, the portal users may access data within the multi-tenant on-demand database system utilizing a portal (e.g., a third party interface such as a web page, software, etc.). Of course, however, the portal may include any means for users other than clients of the system to access data within the system.

Additionally, as shown in operation 204, the access of the plurality of portal users to the multi-tenant on-demand database system is monitored. In one embodiment, an access of records within the multi-tenant on-demand database system by the plurality of portal users may be identified. For example, system record access achieved by one or more of the plurality of portal users through manual sharing, Apex managed sharing, territories, list views, groups, queues, teams, content workspaces, folders, etc. may be identified.

Further, as shown in operation 206, a security report is issued to the client, based on the monitoring. In one embodiment, the results of the monitoring may be output to the client as the security report. For example, the report may summarize the results of the monitoring, provide an analysis of the results of the monitoring, perform one or more actions based on the results of the monitoring, etc. In this way, the client may quickly and easily review the results of the monitoring and may use such results to improve portal security.

In one embodiment, customer portals and partner portals may let you collaborate with and provide services to customers and partners. With portals, information may be shared and captured from third-party users. To ensure that information is protected, it may be important to follow best practices for portal implementation. For example, customers and partners may access system information via portals in many ways. With portal health check reports, this access can be easily monitored. Portal health check reports may show security-related portal settings and provide information that can be used to improve portal security.

Additionally, it should be noted that portal users may access records via many ways. In another embodiment, the security report may include an administrative and user permissions report. The administrative and user permissions can include profile permissions that may expand or restrict user access to data. The administrative and user permissions report may show portal profiles and their critical permission settings. For each profile, the report may list the number of portal users assigned to it, and may optionally list permission settings, such as delegated portal user administrator, send email, convert leads, edit events, edit opportunity product sales price, edit tasks, transfer cases, portal super user, view articles, API enabled, password never expires, create workspaces, view content in portals, export reports, run reports, etc.

Further, in another embodiment, the security report may include an object access and field-level security report. For example, object permissions may specify the access that users have to standard and custom objects. The following object permissions that may be included in the report include read—users can only view records of this type; create—users can read and create records; edit—users can read and update records; delete—users can read, edit, and delete records; etc.

In another embodiment, field-level security may specify the access that users have to specific fields in object records. For example, the object access and field-level security report—one of the optional portal health check reports—may show the number of portal profiles that can access each standard and custom object in a system organization. Each object's field-level security settings and permissions may be viewable. The object-specific reports may list portal profiles, showing the number of users assigned to each profile, the number of visible fields in an object, the object permissions, etc. A user may drill down to portal profile detail pages, where they may edit or clone a profile, view the users assigned to a profile, etc. A user may also drill down to field-level security detail pages, where they may edit the settings, etc.

Further still, in one embodiment, the security report may include a sharing organization-wide defaults report. For example, organization-wide default settings may specify each object's default access level for users in a system organization. If an object's default access level is public, users with enabled object permissions ("Read," "Create," "Edit," "Delete," etc.) may be able to access records that they do not own. For example, if the default access setting for the account object is Public Read/Write, then any user with the "Read" permission on the account object may view any account record. When setting organization-wide defaults, a user may want to make sure they do not let portal users see objects they should not have permission to access.

The sharing organization-wide defaults report—one of the optional portal health check reports—may list standard and custom objects and the default access setting for each object. A user may use this report to review and edit the organization-wide default settings that may expose records to portal users.

Also, in one embodiment, the security report may include a sharing rules report. For example, administrators may use sharing rules to give sets of users access to records they do not own. In a sharing rule, records owned by a set of users (such as a group, role, or territory) may be shared with another set of users. When creating sharing rules, users may want to make sure other portal users do not see records they should not have permission to access.

The sharing rules report—one of the optional portal health check reports—may list all sharing rules that give portal users access to records they do not own. For each sharing rule, the report may specify whether any portal users have access to records, and may let a user edit access levels for the rule. For some types of user sets (like groups, roles, and territories), a user may drill down to detail pages, where they can edit, delete, or manage the users in the set.

In addition, in one embodiment, the report may include multiple categories, where each category may have its own specific needs and different tables may need to be queried for each. Additionally, there may be a list of queries that need to be run utilizing a message queue framework with asynchronous processing. In another embodiment, data required for the report may be stored as an XML, because of the non-uniform nature of each of the sub-reports. This may help avoid having to implement a very complex schema definition and also allow edits/updates to the report without having to do schema changes. In another embodiment, the file may be accessible through a FFX_Blob. However, there may also be two tables which may contain summary information of the report. This may indicate whether the message has been processed by the messaging queue, load the top level page without accessing the XML file, and load all the summary components.

Further, in one embodiment, a portal_security_report table may include a top level table that holds overall data about each report. Its fields may include organization_id, fileforce fields, version_number (e.g., for potential future versioning feature, etc.), last_run_by, last_run_date, report_status (e.g., status of processing the report), etc. In another embodiment, a portal_sub_report table may include a child table that holds data specific to each category. Its fields may include organization_id, portal_security_report_id (e.g., foreign key to parent table, etc.), report_category_type (e.g., there may be an enum for each category type), field 1, field 2, field 3 (which may hold custom data values for each category), etc.

Further still, Table 1 illustrates new values which may be part of category type enum. Of course, it should be noted that the values shown in Table 1 are set forth for illustrative purposes only, and thus should not be construed as limiting in any manner. Additionally, the 2-tier table structure may also support the potential adding of versioning and other features to this report.

TABLE 1

```
<enumItem name="AdminAndUserPerms" dbValue="1" apiValue="AdminAndUserPerms"
internal="true"/>
  <enumItem name="ObjectAccessAndFLS" dbValue="2" apiValue="ObjectAccessAndFLS"
internal="true"/>
  <enumItem name="SharingOrgWideDefaults" dbValue="3"
apiValue="SharingOrgWideDefaults" internal="true"/>
  <enumItem name="CustomSharingRules" dbValue="4" apiValue="CustomSharingRules"
internal="true"/>
  <enumItem name="ManualAndApexManagedSharing" dbValue="5"
apiValue="ManualAndApexManagedSharing" internal="true"/>
  <enumItem name="Territories" dbValue="6" apiValue="Territories" internal="true"/>
  <enumItem name="DocumentFolders" dbValue="7" apiValue="DocumentFolders"
internal="true"/>
  <enumItem name="ReportFolders" dbValue="8" apiValue="ReportFolders" internal="true"/>
  <enumItem name="DashboardFolders" dbValue="9" apiValue="DashboardFolders"
internal="true"/>
  <enumItem name="EmailTemplateFolders" dbValue="10" apiValue="EmailTemplateFolders"
internal="true"/>
  <enumItem name="ListViews" dbValue="11" apiValue="ListViews" internal="true"/>
  <enumItem name="Queues" dbValue="12" apiValue="Queues" internal="true"/>
  <enumItem name="PublicGroups" dbValue="13" apiValue="PublicGroups" internal="true"/>
  <enumItem name="ContentWorkspace" dbValue="14" apiValue="ContentWorkspace"
internal="true"/>
```

In another embodiment, with respect to a messaging queue, when a system administrator hits 'Run Report,' a message may be enqueued from the controller of that page. Once the message is processed, a new XML file with all the queried data may be created, and the summary may be written to the one or both database tables. In yet another embodiment, with respect to XML parsing, once a report has been run it may be stored in the database system as an XML file. In one embodiment, a parser may be used to parse the file into objects. These objects may then be available globally to all the controllers of the page, which may need to have getters for almost all the fields on the objects.

In one implementation, a class structure may be developed for a subreports and subreport container used both for the generation and parsing of the XML file.

Additionally, with respect to performance, in one embodiment, the report may not need to be high performing and the user's interaction with the report may be designed to reflect this. In addition, it may be a setup entity that is only accessible by system administrators. In another embodiment, performance may be improved by making each subreport have an XML file of its own, which may enable the sub-reports to be processed parallel to each other, and the file may then be a zip file that contains multiple XML files. In one embodiment, the XML files may be cached in Memcache.

In one embodiment, reports can be created via a template. For example, while in a web-browsing embodiment, almost all the report pages may have a summary section at the top which is similar and a detail section at the bottom sufficiently different enough to warrant a separate page for each section. A template may be used to render the summary section of each page. In one embodiment, there may be a hierarchy structure for the controllers for these embedded pages.

Further, with respect to a user interface, there may be pages with graphical content embedded in the reports (e.g. via salesforce.com's Visualforce technology). In one embodiment, the graphical content may be created as a part of or as the entirety of a report.

In another embodiment, customer and partner portals may be used by customers to provide access to their end customers and partners. In one embodiment, portals may allow an organization to share their data with users other than its own users and employees and collaborate with others as part of their business processes. Security around these portals may be very important, so that customers may avoid exposing company confidential information with 3rd party users.

Additionally, in one embodiment, the report tool may be available as part of a security controls section in the setup hierarchy: Setup>Admin Setup>Security Controls>Portal Health Check. FIG. 3 shows an exemplary interface 300 for accessing the portal health check tool in the administration setup. In another embodiment, one or more permissions may be needed to access the report. For example, view setup and configuration, customize application, manage users, and modify all data permissions may be necessary to access the report.

Figure 4:
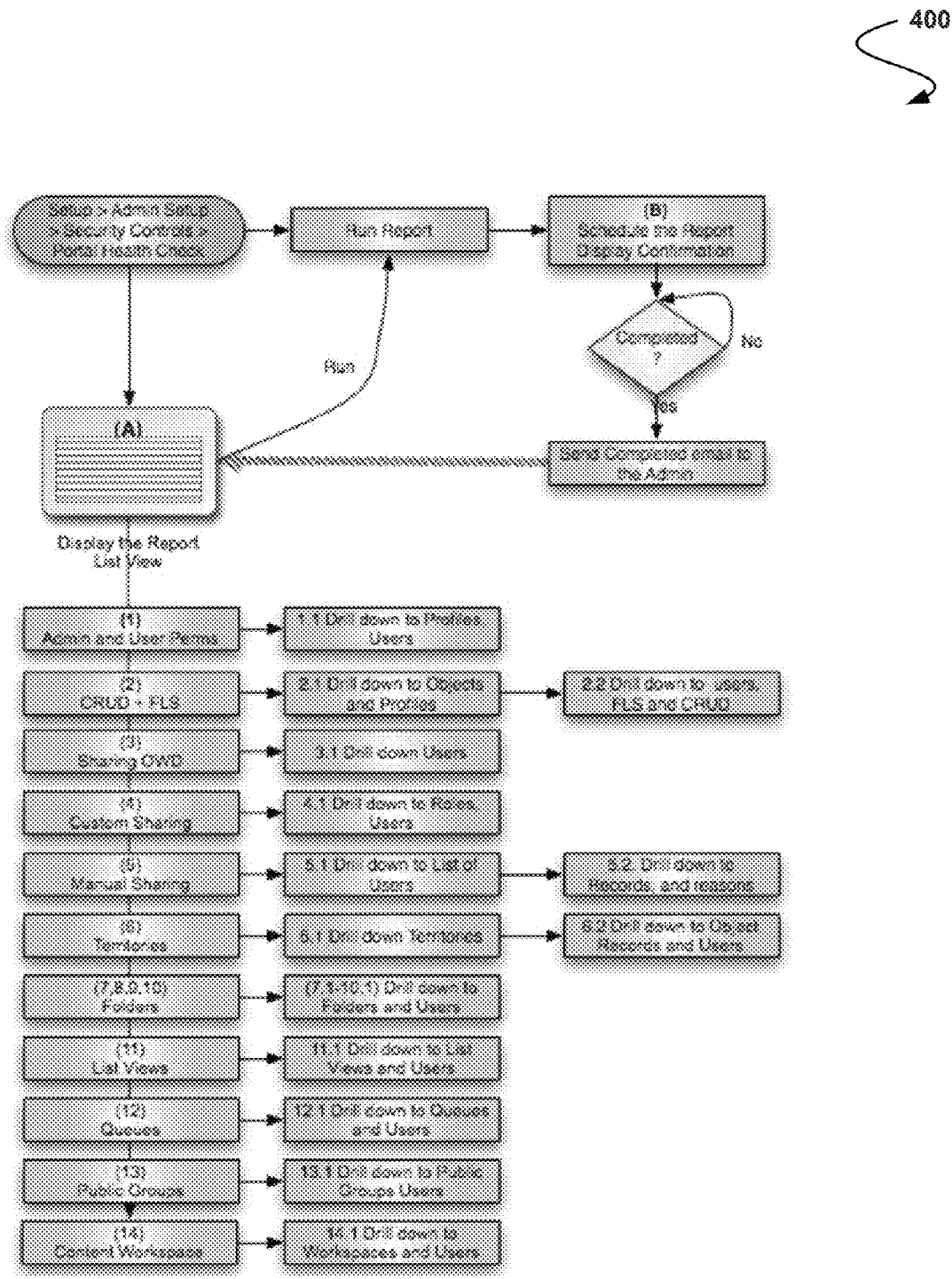
FIG. 4 illustrates an exemplary user flow for accessing the portal health check report, in accordance with one embodiment.
Figure 5:
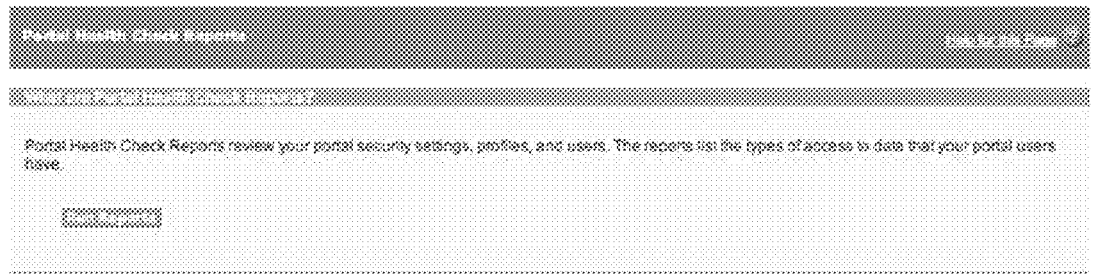
FIG. 5 illustrates an exemplary description page, in accordance with another embodiment.
Figure 6:
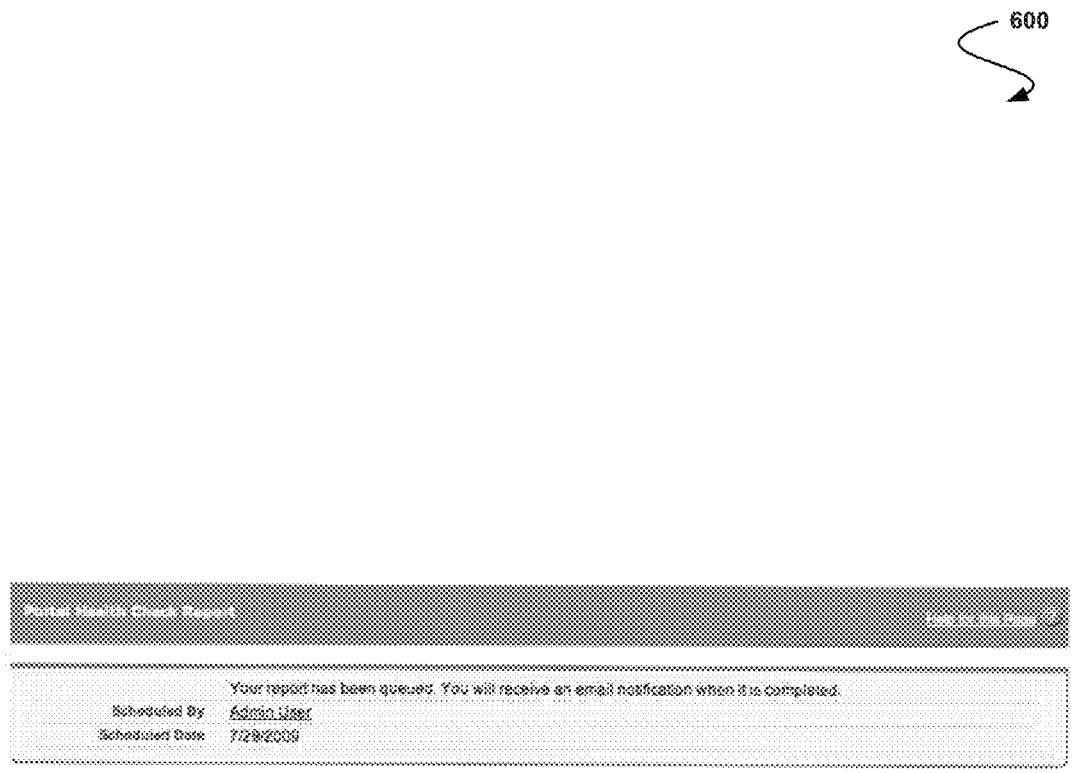
FIG. 6 illustrates an exemplary scheduled report information page, in accordance with one embodiment.

Further, in one embodiment, at a high level administrators (e.g., with the right permissions) can run the report and drill down latest report results. FIG. 4 illustrates an exemplary user flow 400 for accessing the portal health check report. In another embodiment, when administrators come to the report page for the first time, they may see the description page with a run button. FIG. 5 illustrates an exemplary description page 500, in accordance with one embodiment. In yet another embodiment, the report may run as a batch report, and administrators may see the scheduled report information. FIG. 6 illustrates an exemplary scheduled report information page 600, in accordance with one embodiment.

Figure 7:
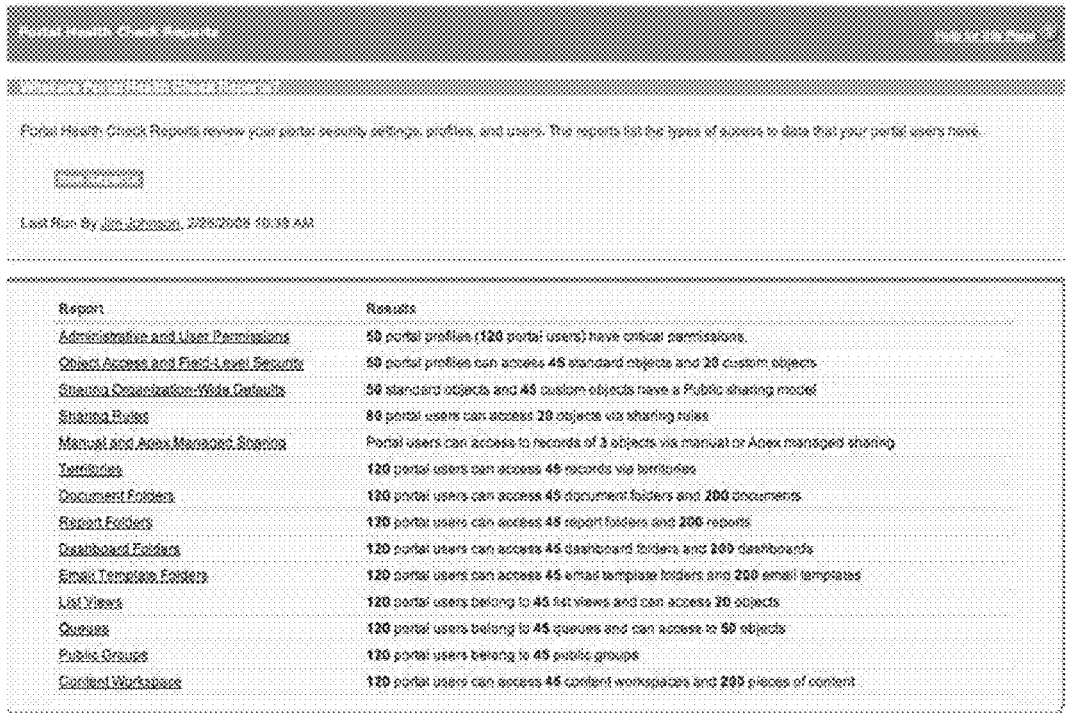
FIG. 7 illustrates an exemplary report summary, in accordance with another embodiment.

Further still, in one embodiment, when the report is completed, the individual who scheduled the report may get an email notification. In another embodiment, administrators may navigate to the portal health check report page to see the summary of the report results. For example, the report may be broken down to the logical categories in order to make the results contextual and readable. Categories may include: admin and user permissions, object permissions and FLS, sharing org wide defaults, sharing rules, manual and apex managed sharing, territories, document folders, report folders, dashboard folders, email template folders, list views, queues, public groups, content workspace, etc. FIG. 7 illustrates an exemplary report summary 700, in accordance with one embodiment.

Figure 8:
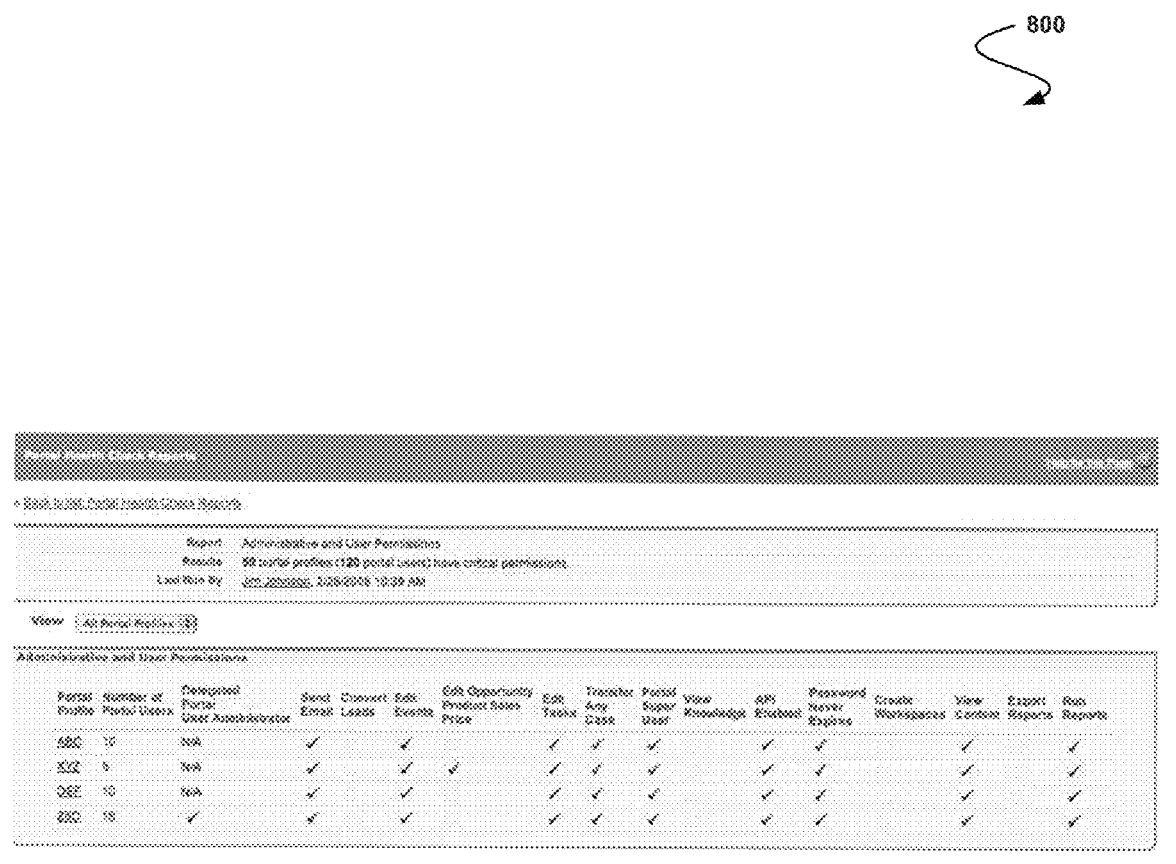

Also, in one embodiment, at the top of each drill down report, the same summary information may be repeated. FIG. 8 illustrates an exemplary administrator and user permissions report summary 800, in accordance with one embodiment. In another embodiment, the permission report may allow users to filter the result by all portal profiles and by a specific portal profile. In another embodiment, administrators may see how many portal users would have what type of permissions by profile. In yet another embodiment, the following permissions may be checked: delegated portal user admin, send email, convert leads, edit events, edit opportunity product sales price, edit tasks, transfer any case, portal super user, view knowledge, API enabled, password never expires, create workspaces, view content, export reports, run reports, etc. In another embodiment, profile drill down may take users to the standard profile page.

Figure 9:
FIG. 9 illustrates an exemplary first part of an object permissions and FLS report, in accordance with another embodiment.
Figure 10:
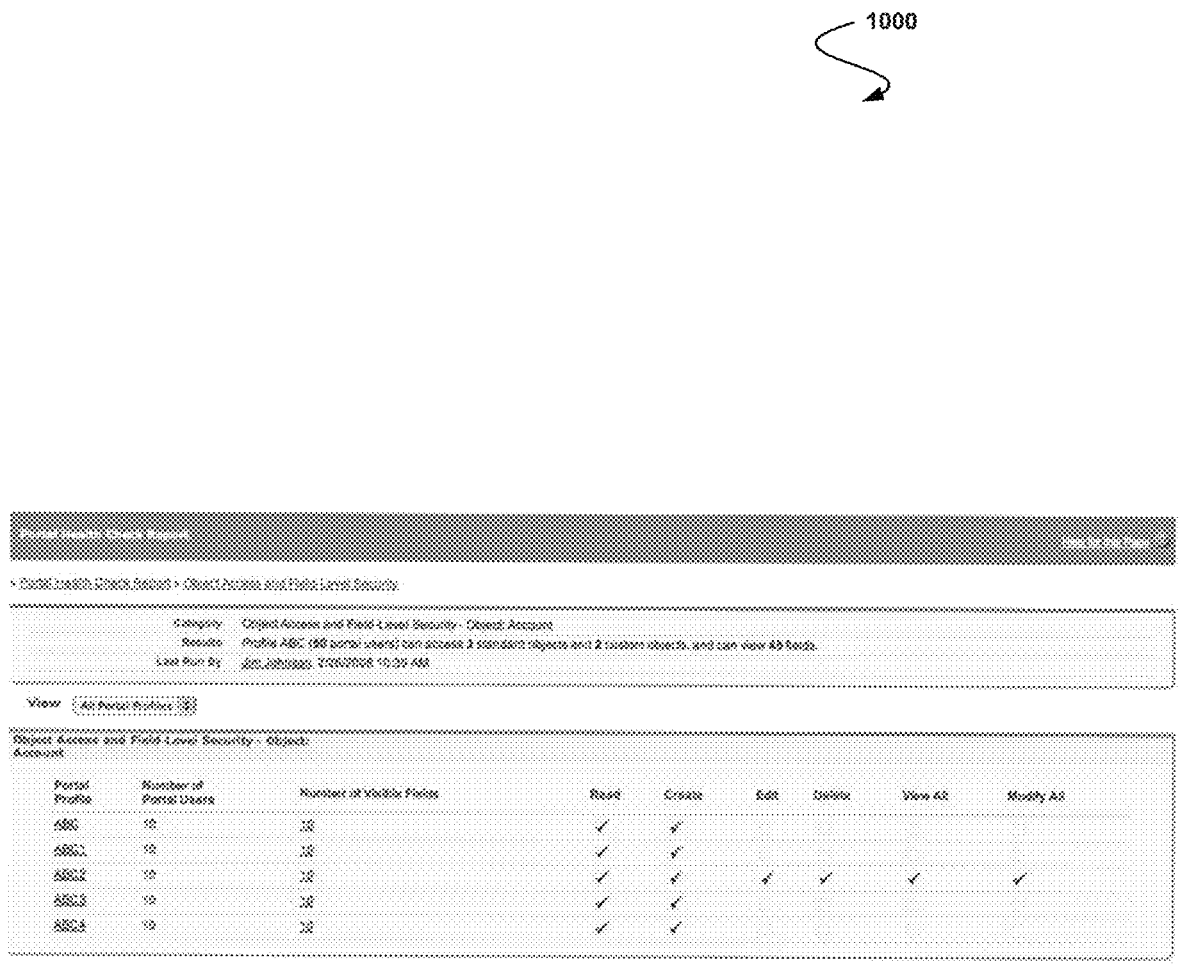
FIG. 10 illustrates an exemplary profile drill down, in accordance with one embodiment.

Additionally, in another embodiment, the object permissions and FLS report may be broken into two parts. FIG. 9 illustrates an exemplary first part 900 of the object permissions and FLS report, which may provide information on how many portal profiles have access to which object. FIG. 10 illustrates an exemplary profile drill down 1000, which may take users to the page where administrators can easily see the object level permissions for each object for the selected profile. Each row may also provide the number of visible fields for the object-profile combination. FLS drill down may take users to the standard FLS UI for the related object.

Figure 11:
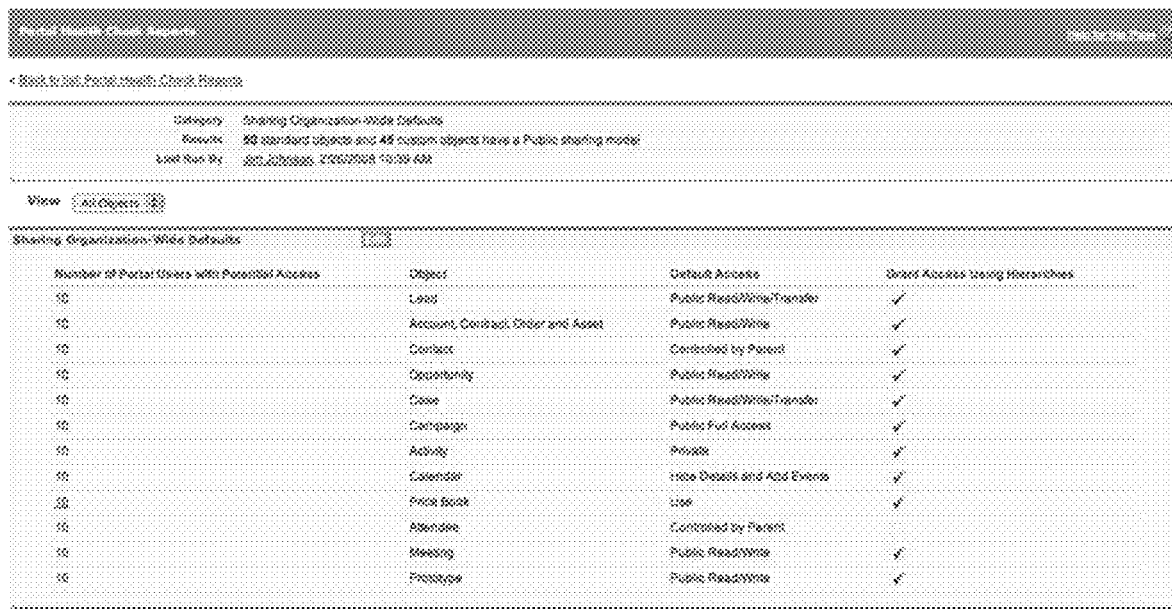
FIG. 11 illustrates an exemplary sharing organization wide defaults report, in accordance with another embodiment.

FIG. 11 illustrates an exemplary sharing organization wide defaults report 1100, in accordance with one embodiment. In another embodiment, the sharing OWD report may be similar to the standard sharing page. However, this report may provide the portal context. Administrators may see how many portal users are getting what type of access to which objects. The edit button may take the user to the sharing OWD edit page.

Figure 12:
FIG. 12 illustrates an exemplary sharing rules report, in accordance with one embodiment.

FIG. 12 illustrates an exemplary sharing rules report 1200, in accordance with one embodiment. In another embodiment, the custom sharing rules report may be similar to the standard sharing page. However, this report may provide the portal context. Administrators may see how many portal users are getting what type access to which objects. The edit action links may take a user to the specific sharing rule edit page.

Figure 13:
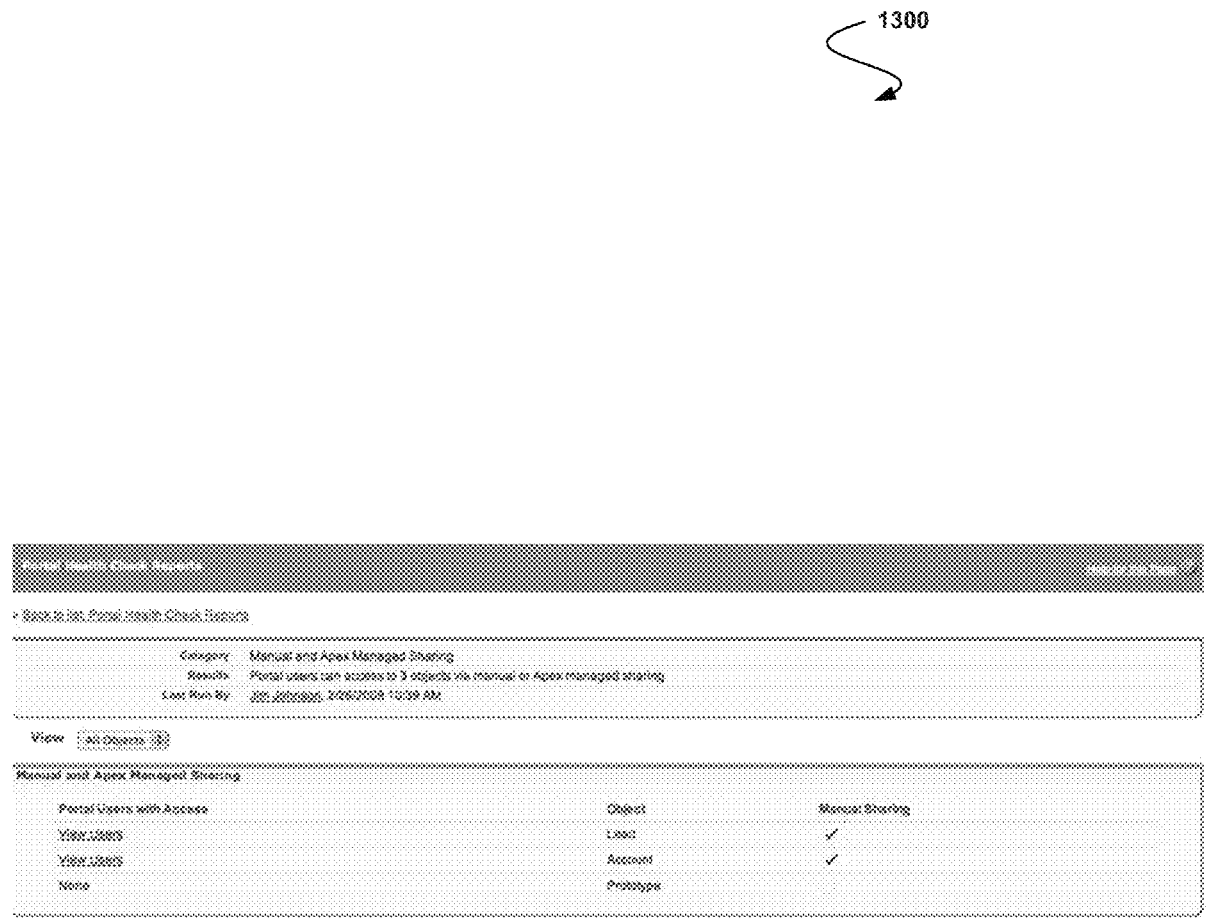
FIG. 13 illustrates an exemplary manual and apex managed sharing report page, in accordance with another embodiment.
Figure 14:
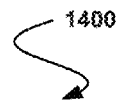
FIG. 14 illustrates an exemplary list of related portal users page, in accordance with one embodiment.
Figure 15:
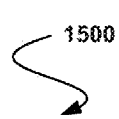
FIG. 15 illustrates an exemplary object records page, in accordance with another embodiment.
Figure 16:
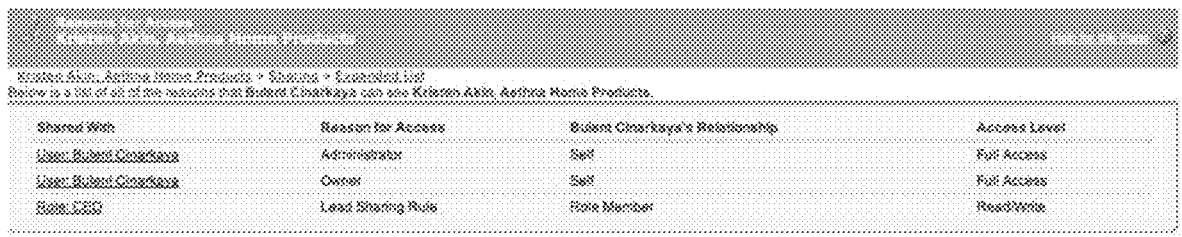
FIG. 16 illustrates an exemplary access reasons page, in accordance with one embodiment.

FIG. 13 illustrates an exemplary manual and apex managed sharing report page 1300, in accordance with one embodiment. In another embodiment, the manual sharing report may have two parts. The first page provides high level information on which objects can be accessed by portal users via manual or apex managed sharing. Additionally, in one embodiment, view users column drill down may takes administrators to the list of related portal users page. FIG. 14 illustrates an exemplary list of related portal users page 1400, in accordance with one embodiment. In another embodiment, view records may drill down takes users to the list of records (e.g., accessible via manual sharing or apex managed sharing) for a given object and for a given user. FIG. 15 illustrates an exemplary object records page 1500, in accordance with one embodiment. Further, in one embodiment, the why column may take a user to a page where they can see why the given users can access a given record. FIG. 16 illustrates an exemplary access reasons page 1600, in accordance with one embodiment.

Figure 17:
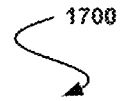
FIG. 17 illustrates an exemplary territories report page, in accordance with another embodiment.

Also, in another embodiment, a territories report may have two parts. For example, a first page may provide high level information about the number of account, opportunity and leads records for each territory that exist relating to the portal users. Territory drill downs may take users to the territory setup page. FIG. 17 illustrates an exemplary territories report page 1700, in accordance with one embodiment.

Figure 18:
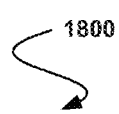
FIG. 18 illustrates an exemplary document folders report page, in accordance with one embodiment.
Figure 19:
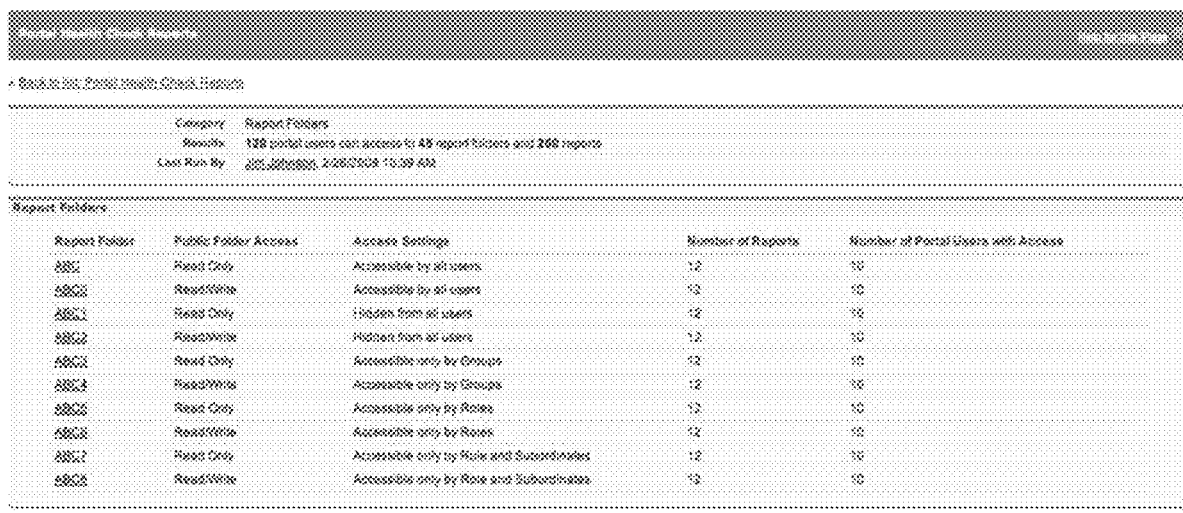
FIG. 19 illustrates an exemplary report folders report page, in accordance with another embodiment.

In addition, in one embodiment, folder reports may all be a similar type of report. A document folders report may show all the document folders that are accessible by the portal users. It may provide access level, access settings, number of items in folders and number of portal users who have access to these folders. FIG. 18 illustrates an exemplary document folders report page 1800, in accordance with one embodiment. Further, in another embodiment, a reports folders report may show all the report folders that are accessible by the portal users. It may provide access level, access settings, number of items in folders and a number of portal users who have access to these folders. FIG. 19 illustrates an exemplary report folders report page 1900, in accordance with one embodiment.

Figure 20:
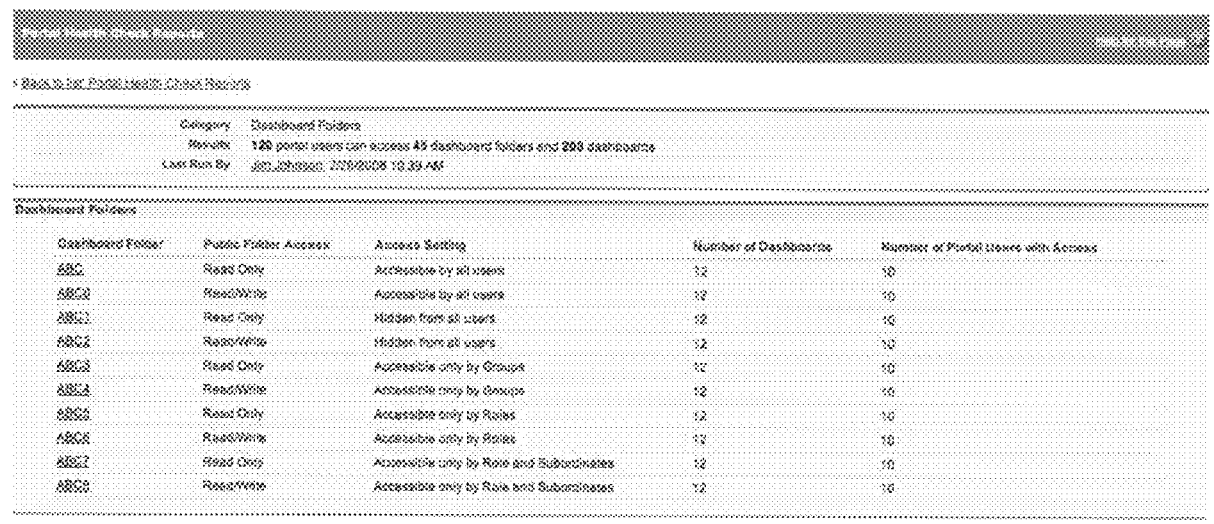
FIG. 20 illustrates an exemplary dashboard folders report page, in accordance with one embodiment.
Figure 21:
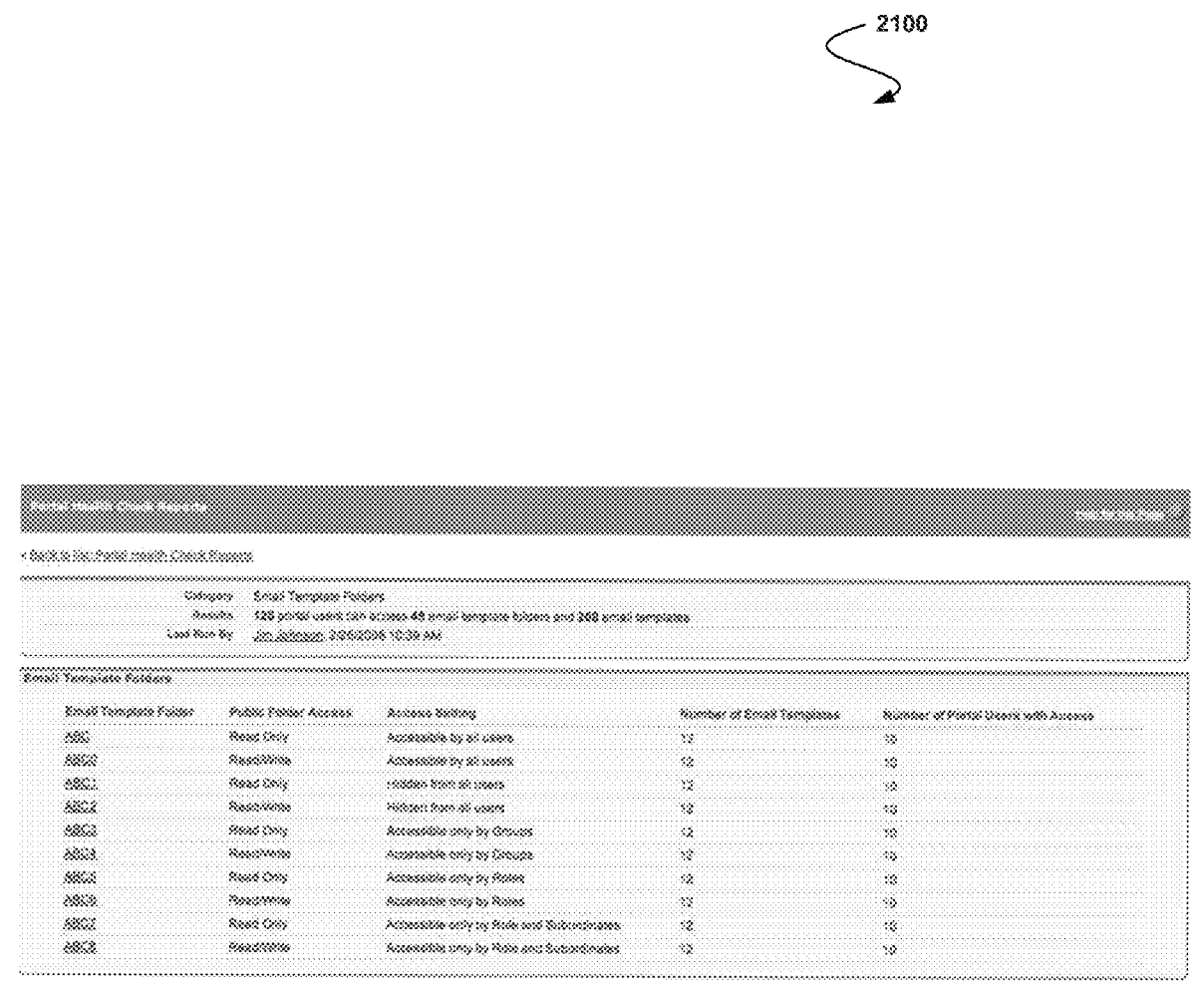

Further still, in one embodiment, a dashboard folders report may show all the dashboard folders that are accessible by the portal users. It may provide access level, access settings, number of items in folders and number of portal users who have access to these folders. FIG. 20 illustrates an exemplary dashboard folders report page 2000, in accordance with one embodiment. Also, in another embodiment, an email template folders report may show all the email template folders that are accessible by the portal users. It may provide access level, access settings, number of items in folders and number of portal users who have access to these folders. FIG. 21 illustrates an exemplary email template folders report page 2100, in accordance with one embodiment.

Figure 22:
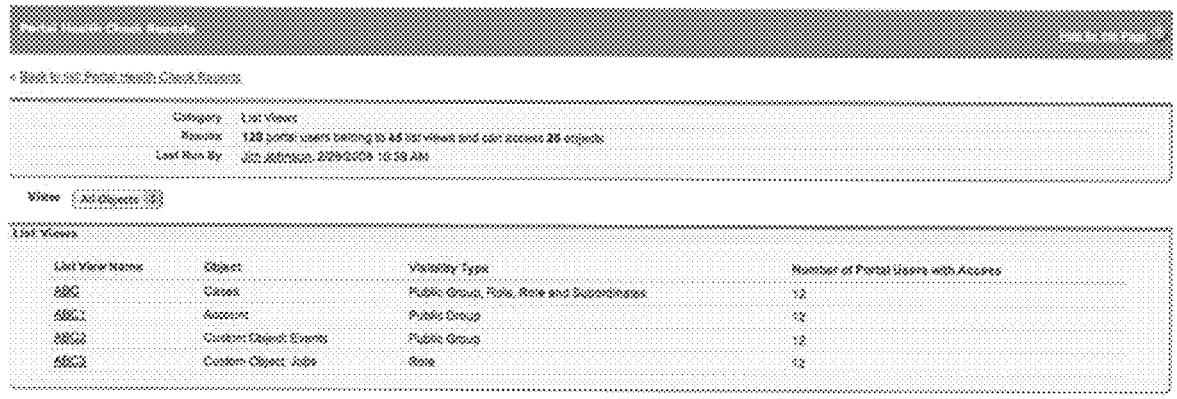
FIG. 22 illustrates an exemplary list views report page, in accordance with one embodiment.
Figure 23:
FIG. 23 illustrates an exemplary queues report page, in accordance with another embodiment.

Additionally, in another embodiment, a list views report may display all the list views which portal users can access. It may provide filtering based on objects and may allow drill down to list view edit pages and list of portal users page. FIG. 22 illustrates an exemplary list views report page 2200, in accordance with one embodiment. Further, a queues report may display all the queues which portal users are members. It may allow drill down to a queue details edit page and a list of portal users page. FIG. 23 illustrates an exemplary queues report page 2300, in accordance with one embodiment.

Figure 24:
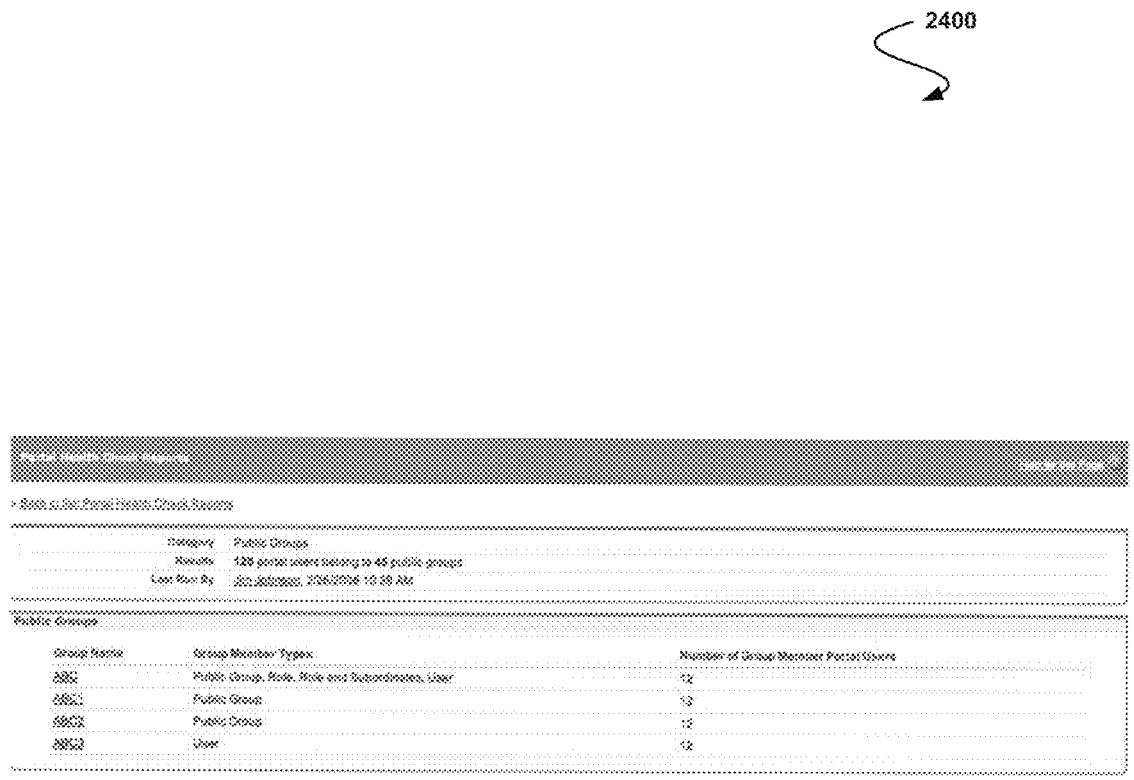
FIG. 24 illustrates an exemplary public groups report page, in accordance with one embodiment.
Figure 25:
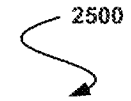
FIG. 25 illustrates an exemplary content workspace report page, in accordance with another embodiment.

Further still, in one embodiment, a public groups report may display all the public groups which portal users are members. It may allow drill down to group details edit page and list of portal users page. FIG. 24 illustrates an exemplary public groups report page 2400, in accordance with one embodiment. Also, in another embodiment, a content workspace report may show all the content workspaces that are accessible by the portal users. It may provide a number of portal users based on their access levels, access level, the number of items in workspaces, etc. FIG. 25 illustrates an exemplary content workspace report page 2500, in accordance with one embodiment.

System Overview

Figure 26:
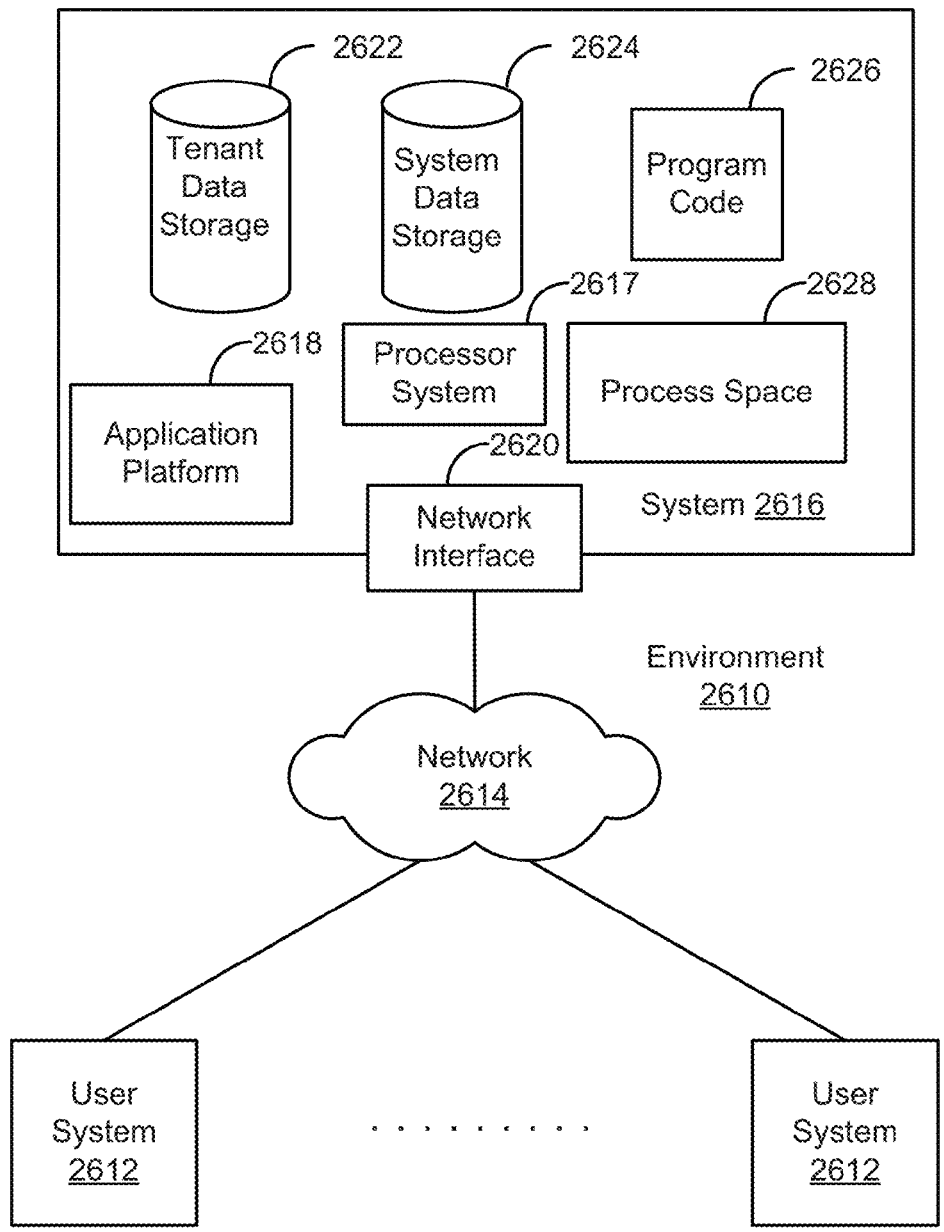
FIG. 26 illustrates a block diagram of an example of an environment wherein an on-demand database system might be used.

FIG. 26 illustrates a block diagram of an environment 2610 wherein an on-demand database system might be used. Environment 2610 may include user systems 2612, network 2614, system 2616, processor system 2617, application platform 2618, network interface 2620, tenant data storage 2622, system data storage 2624, program code 2626, and process space 2628. In other embodiments, environment 10 may not have all of the components listed and/or may have other elements instead of, or in addition to, those listed above.

Environment 2610 is an environment in which an on-demand database system exists. User system 2612 may be any machine or system that is used by a user to access a database user system. For example, any of user systems 2612 can be a handheld computing device, a mobile phone, a laptop computer, a work station, and/or a network of computing devices. As illustrated in FIG. 26 (and in more detail in FIG. 27) user systems 2612 might interact via a network 2614 with an on-demand database system, which is system 2616.

An on-demand database system, such as system 2616, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 2616" and "system 2616" will be used interchangeably herein. A database image may include one or more database objects. A relational database management system (RDMS) or the equivalent may execute storage and retrieval of information against the database object(s). Application platform 2618 may be a framework that allows the applications of system 2616 to run, such as the hardware and/or software, e.g., the operating system. In an embodiment, on-demand database system 2616 may include an application platform 2618 that enables creation, managing and executing one or more applications developed by the provider of the on-demand database system, users accessing the on-demand database system via user systems 2612, or third party application developers accessing the on-demand database system via user systems 2612.

The users of user systems 2612 may differ in their respective capacities, and the capacity of a particular user system 2612 might be entirely determined by permissions (permission levels) for the current user. For example, where a salesperson is using a particular user system 2612 to interact with system 2616, that user system has the capacities allotted to that salesperson. However, while an administrator is using that user system to interact with system 2616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 2614 is any network or combination of networks of devices that communicate with one another. For example, network 2614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 2612 might communicate with system 2616 using TCP/IP and, at a higher network level, use other common Internet protocols to communicate, such as HTTP, FTP, AFS, WAP, etc. In an example where HTTP is used, user system 2612 might include an HTTP client commonly referred to as a "browser" for sending and receiving HTTP messages to and from an HTTP server at system 2616. Such an HTTP server might be implemented as the sole network interface between system 2616 and network 2614, but other techniques might be used as well or instead. In some implementations, the interface between system 2616 and network 2614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2616, shown in FIG. 26, implements a web-based customer relationship management (CRM) system. For example, in one embodiment, system 2616 includes application servers configured to implement and execute CRM software applications as well as provide related data, code, forms, webpages and other information to and from user systems 2612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2616 implements applications other than, or in addition to, a CRM application. For example, system 2616 may provide tenant access to multiple hosted (standard and custom) applications, including a CRM application. User (or third party developer) applications, which may or may not include CRM, may be supported by the application platform 2618, which manages creation, storage of the applications into one or more database objects and executing of the applications in a virtual machine in the process space of the system 2616.

One arrangement for elements of system 2616 is shown in FIG. 26, including a network interface 2620, application platform 2618, tenant data storage 2622 for tenant data 2623, system data storage 2624 for system data 2625 accessible to system 2616 and possibly multiple tenants, program code 2626 for implementing various functions of system 2616, and a process space 2628 for executing MTS system processes and tenant-specific processes, such as running applications as part of an application hosting service. Additional processes that may execute on system 2616 include database indexing processes.

Several elements in the system shown in FIG. 26 include conventional, well-known elements that are explained only briefly here. For example, each user system 2612 could include a desktop personal computer, workstation, laptop, PDA, cell phone, or any wireless access protocol (WAP) enabled device or any other computing device capable of interfacing directly or indirectly to the Internet or other network connection. User system 2612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 2612 to access, process and view information, pages and applications available to it from system 2616 over network 2614. Each user system 2612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 2616 or other systems or servers. For example, the user interface device can be used to access data and applications hosted by system 2616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 2612 and all of its components are operator configurable using applications, such as a browser, including computer code run using a central processing unit such as an Intel Pentium® processor or the like. Similarly, system 2616 (and additional instances of an MTS, where more than one is present) and all of their components might be operator configurable using application(s) including computer code to run using a central processing unit such as processor system 2617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 2616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 2616 is configured to provide webpages, forms, applications, data and media content to user (client) systems 2612 to support the access by user systems 2612 as tenants of system 2616. As such, system 2616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 27:
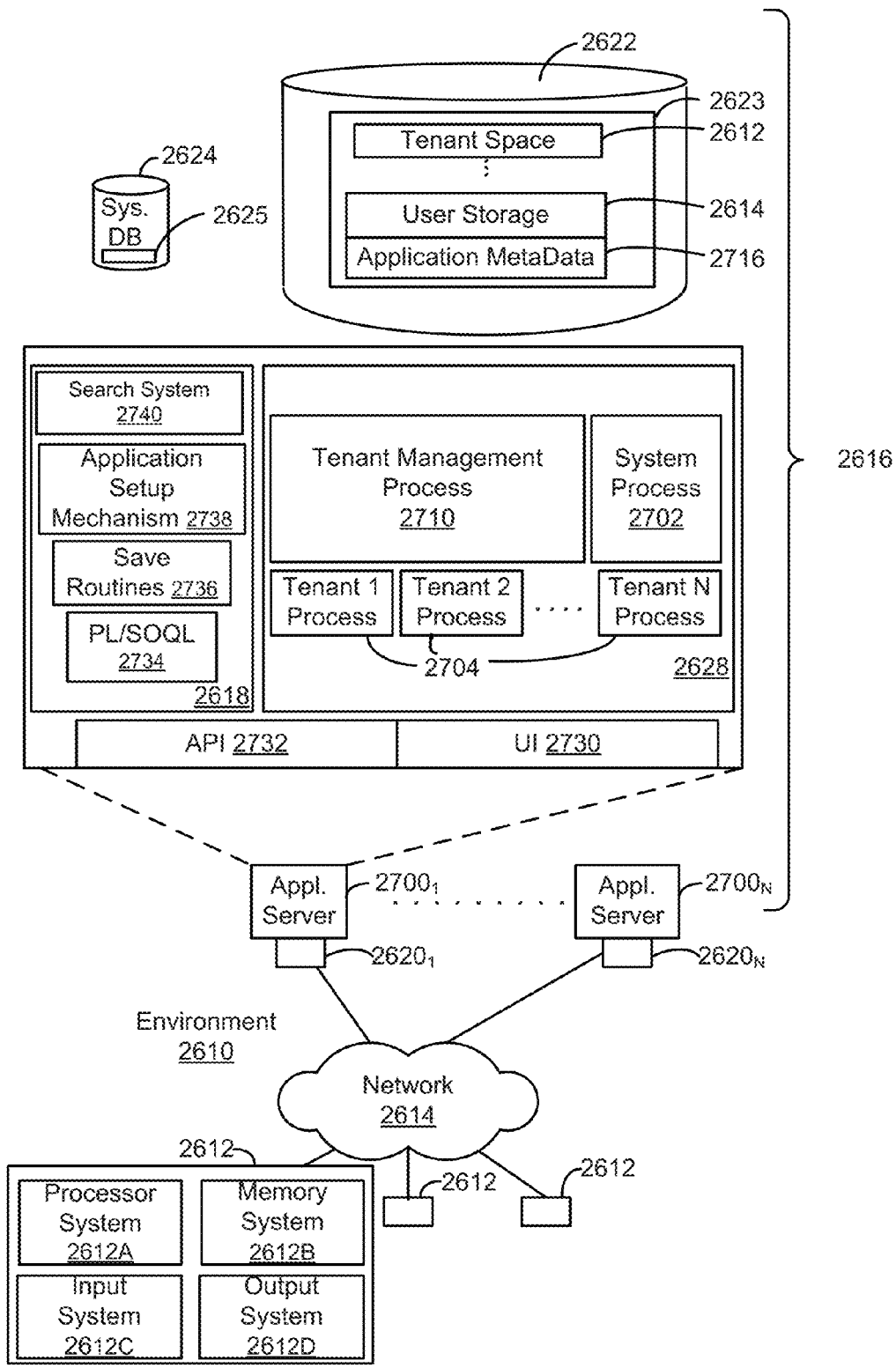
FIG. 27 illustrates a block diagram of an embodiment of elements of FIG. 9 and various possible interconnections between these elements.

FIG. 27 also illustrates environment 2610. However, in FIG. 27 elements of system 2616 and various interconnections in an embodiment are further illustrated. FIG. 27 shows that user system 2612 may include processor system 2612A, memory system 2612B, input system 2612C, and output system 2612D. FIG. 27 shows network 2614 and system 2616. FIG. 27 also shows that system 2616 may include tenant data storage 2622, tenant data 2623, system data storage 2624, system data 2625, User Interface (UI) 2730, Application Program Interface (API) 2732, PL/SOQL 2734, save routines 2736, application setup mechanism 2738, applications servers 27001-2700N, system process space 2702, tenant process spaces 2704, tenant management process space 2710, tenant storage area 2712, user storage 2714, and application metadata 2716. In other embodiments, environment 2610 may not have the same elements as those listed above and/or may have other elements instead of, or in addition to, those listed above.

User system 2612, network 2614, system 2616, tenant data storage 2622, and system data storage 2624 were discussed above in FIG. 26. Regarding user system 2612, processor system 2612A may be any combination of one or more processors. Memory system 2612B may be any combination of one or more memory devices, short term, and/or long term memory. Input system 2612C may be any combination of input devices, such as one or more keyboards, mice, trackballs, scanners, cameras, and/or interfaces to networks. Output system 2612D may be any combination of output devices, such as one or more monitors, printers, and/or interfaces to networks. As shown by FIG. 27, system 2616 may include a network interface 2620 (of FIG. 26) implemented as a set of HTTP application servers 2700, an application platform 2618, tenant data storage 2622, and system data storage 2624. Also shown is system process space 2702, including individual tenant process spaces 2704 and a tenant management process space 2710. Each application server 2700 may be configured to tenant data storage 2622 and the tenant data 2623 therein, and system data storage 2624 and the system data 2625 therein to serve requests of user systems 2612. The tenant data 2623 might be divided into individual tenant storage areas 2712, which can be either a physical arrangement and/or a logical arrangement of data. Within each tenant storage area 2712, user storage 2714 and application metadata 2716 might be similarly allocated for each user. For example, a copy of a user's most recently used (MRU) items might be stored to user storage 2714. Similarly, a copy of MRU items for an entire organization that is a tenant might be stored to tenant storage area 2712. A UI 2730 provides a user interface and an API 2732 provides an application programmer interface to system 2616 resident processes to users and/or developers at user systems 2612. The tenant data and the system data may be stored in various databases, such as one or more Oracle™ databases.

Application platform 2618 includes an application setup mechanism 2738 that supports application developers' creation and management of applications, which may be saved as metadata into tenant data storage 2622 by save routines 2736 for execution by subscribers as one or more tenant process spaces 2704 managed by tenant management process 2710 for example. Invocations to such applications may be coded using PL/SOQL 2734 that provides a programming language style interface extension to API 2732. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 2716 for the subscriber making the invocation and executing the metadata as an application in a virtual machine.

Each application server 2700 may be communicably coupled to database systems, e.g., having access to system data 2625 and tenant data 2623, via a different network connection. For example, one application server 2700₁ might be coupled via the network 2614 (e.g., the Internet), another application server 2700N-1 might be coupled via a direct network link, and another application server 2700N might be coupled by yet a different network connection. Transfer Control Protocol and Internet Protocol (TCP/IP) are typical protocols for communicating between application servers 2700 and the database system. However, it will be apparent to one skilled in the art that other transport protocols may be used to optimize the system depending on the network interconnect used.

In certain embodiments, each application server 2700 is configured to handle requests for any user associated with any organization that is a tenant. Because it is desirable to be able to add and remove application servers from the server pool at any time for any reason, there is preferably no server affinity for a user and/or organization to a specific application server 2700. In one embodiment, therefore, an interface system implementing a load balancing function (e.g., an F5 Big-IP load balancer) is communicably coupled between the application servers 2700 and the user systems 2612 to distribute requests to the application servers 2700. In one embodiment, the load balancer uses a least connections algorithm to route user requests to the application servers 2700. Other examples of load balancing algorithms, such as round robin and observed response time, also can be used. For example, in certain embodiments, three consecutive requests from the same user could hit three different application servers 2700, and three requests from different users could hit the same application server 2700. In this manner, system 2616 is multi-tenant, wherein system 2616 handles storage of, and access to, different objects, data and applications across disparate users and organizations.

As an example of storage, one tenant might be a company that employs a sales force where each salesperson uses system 2616 to manage their sales process. Thus, a user might maintain contact data, leads data, customer follow-up data, performance data, goals and progress data, etc., all applicable to that user's personal sales process (e.g., in tenant data storage 2622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2616 might also maintain system level data usable by multiple tenants or other data. Such system level data might include industry reports, news, postings, and the like that are sharable among tenants.

In certain embodiments, user systems 2612 (which may be client systems) communicate with application servers 2700 to request and update system-level and tenant-level data from system 2616 that may require sending one or more queries to tenant data storage 2622 and/or system data storage 2624. System 2616 (e.g., an application server 2700 in system 2616) automatically generates one or more SQL statements (e.g., one or more SQL queries) that are designed to access the desired information. System data storage 2624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
reporting accessibility of a plurality of users provided access via a portal to a plurality of client data objects stored in tangible memory, wherein the plurality of client data objects are grouped as a client data set, including:
identifying one or more group-based or role-based system permissions that give at least some users access to the client data objects in the client data set;
identifying one or more sharing rules that give at least some users access to shared client data objects in the client data set; and
for at least a subset of the client data objects in the client data set, generating data and at least commencing notifying a client using the data generated, of the group-based or role-based system permissions and the one or more sharing rules identified as giving to users access via the portal to the subset of the client data objects.

2. The method of claim 1,
wherein users are associated with at least one client of a system accessible via a portal and the system limits user access to the client data set.

3. The method of claim 1,
wherein the role-based system permissions include hierarchical role-based permissions.

4. The method of claim 1, further including:
identifying territory-based system permissions that give to at least some users access to the client data objects in the client data set;
wherein at least some users are associated with territories; and
generating the data to further notify the client of the territory-based system permissions that give to users access via the portal to the subset of the client data objects.

5. The method of claim 1, further including:
aggregating the group-based or role-based system permissions and sharing rules to report counts for the accessibility via the portal to the subset of the client data objects.

6. The method of claim 5, further including:
aggregating a number of users having the accessibility via the portal to the subset of the client data objects.

7. The method of claim 5, further including:
aggregating a number of user groups having the accessibility via the portal to the subset of the client data objects.

8. The method of claim 5, further including:
aggregating a number of the one or more sharing rules providing the accessibility via the portal to the subset of the client data objects.

9. The method of claim 1, further including:
summarizing the accessibility to contact and lead data objects included in the client data set.

10. The method of claim 1, further including:
summarizing the accessibility to report data objects included in the client data set.

11. The method of claim 1, further including:
summarizing application of the one or more sharing rules by first users associated with a first client with second users associated with a second client.

12. The method of claim 1, further including:
summarizing application of the one or more sharing rules by first users associated with a first client that share client data with second users associated with a second client, wherein the second client is a customer or partner of the first client.

13. A non-transitory computer readable storage medium, including computer program instructions that implement a method comprising:
reporting accessibility of a plurality of users provided access via a portal to a plurality of client data objects stored in tangible memory, wherein the plurality of client data objects are grouped as a client data set, including:
identifying one or more group-based or role-based system permissions that give at least some of users, access to the client data objects in the client data set;
identifying one or more sharing rules that give at least some users access to shared client data objects in the client data set; and
for at least a subset of the client data objects in the client data set, generating data and at least commencing notifying a client using the data generated, of the group-based or role-based system permissions and the one or more sharing rules identified as giving to users access via the portal to the subset of the client data objects.

14. The non-transitory computer readable storage medium of claim 13,
wherein users are associated with at least one client of a system accessible via a portal and the system limits user access to the client data set.

15. The non-transitory computer readable storage medium of claim 13,
wherein the role-based system permissions include hierarchical role-based permissions.

16. The non-transitory computer readable storage medium of claim 13, further including instructions to implement the method comprising:
identifying territory-based system permissions that give to at least some users access to the client data objects in the client data set;
wherein at least some users are associated with territories; and generating the data to further notify the client of the territory-based system permissions that give to users access via the portal to the subset of the client data objects.

17. The non-transitory computer readable storage medium of claim 13, further including instructions to implement the method comprising:
aggregating the group-based or role-based system permissions and sharing rules to report counts for the accessibility via the portal to the subset of the client data objects.

18. The non-transitory computer readable storage medium of claim 13, further including instructions to implement the method comprising:
summarizing application of the one or more sharing rules by first users associated with a first client that share client data with second users associated with a second client, wherein the second client is a customer or partner of the first client.

19. A system comprising:
a processor, memory coupled to the processor, and computer program instructions stored in the memory that implement a method comprising:
reporting accessibility of a plurality of users provided access via a portal to a plurality of client data objects stored in tangible memory, wherein the plurality of client data objects are grouped as a client data set, including:
identifying one or more group-based or role-based system permissions that give at least some users access to the client data objects in the client data set;
identifying one or more sharing rules that give at least some users access to the client data objects in the client data set; and
for at least a subset of the client data objects in the client data set, generating data and at least commencing notifying a client using the data generated, of the group-based or role-based system permissions and the one or more sharing rules identified as giving to users access via the portal to the subset of the client data objects.

20. The system of claim 19, further including:
identifying territory-based system permissions that give to at least some users access to the client data objects in the client data set;
wherein at least some users are associated with territories; and
generating the data to further notify the client of the territory-based system permissions that give to users access via the portal to the subset of the client data objects.

21. The system of claim 19, further including:
aggregating the group-based or role-based system permissions and sharing rules to report counts for the accessibility via the portal to the subset of the client data objects.

22. The method of claim 21, further including:
aggregating a number of users having the accessibility via the portal to the subset of the client data objects.

23. The method of claim 21, further including:
aggregating a number of the one or more sharing rules providing the accessibility via the portal to the subset of the client data objects.

24. The system of claim 19, further including:
summarizing application of the one or more sharing rules by first users associated with a first client with second users associated with a second client.

25. The system of claim 19, further including:
summarizing application of the one or more sharing rules by first users associated with a first client that share client data with second users associated with a second client, wherein the second client is a customer or partner of the first client.

* * * * *